Dec. 14, 1943.  A. H. COHEN  2,336,467
PUPPET FOR STOP-MOTION PHOTOGRAPHY AND ANCHORING MEANS THEREFOR
Filed Dec. 16, 1941   3 Sheets-Sheet 1
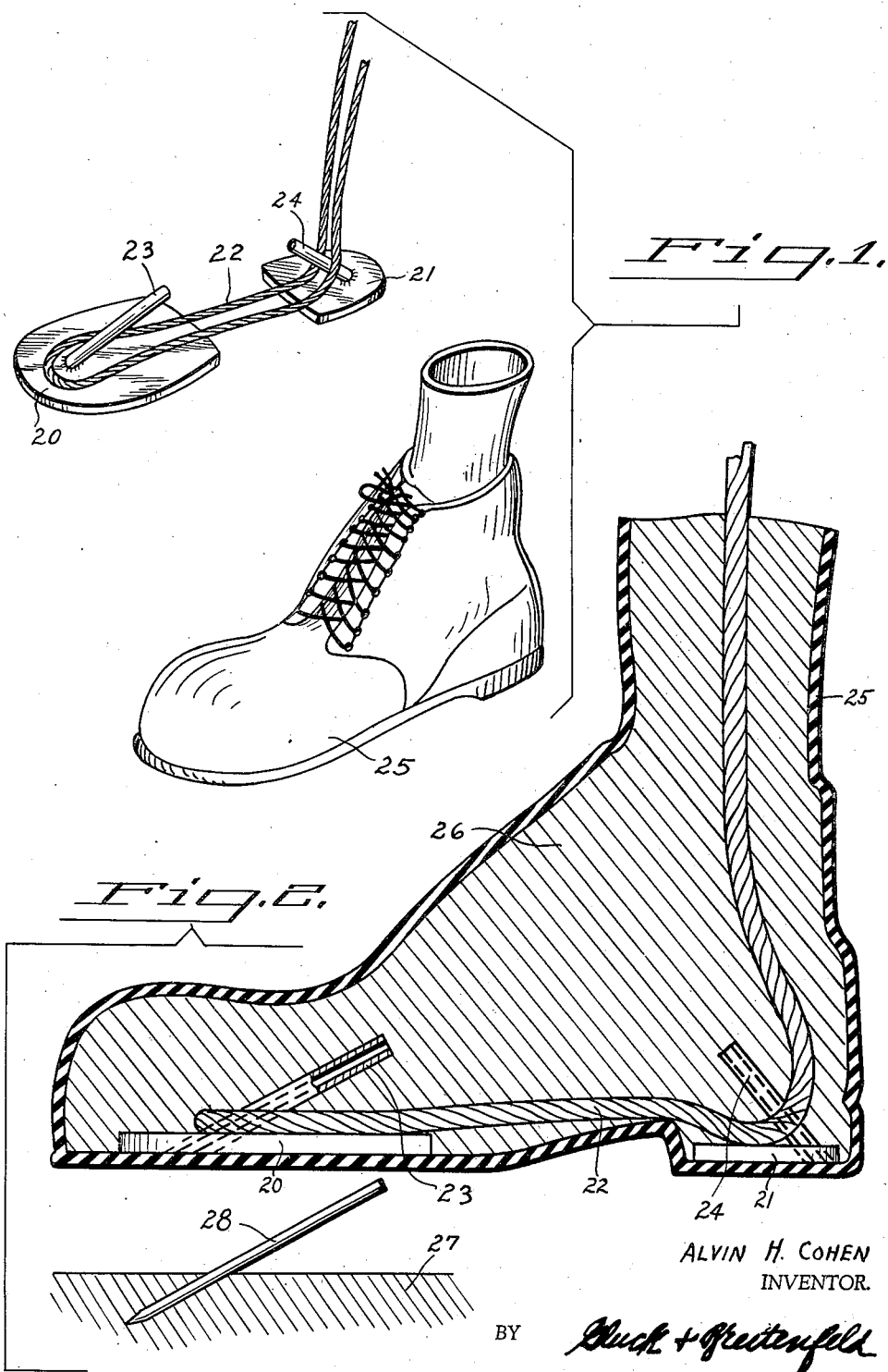
ALVIN H. COHEN
INVENTOR.
BY
ATTORNEYS Dec. 14, 1943.　　　A. H. COHEN　　　2,336,467
PUPPET FOR STOP-MOTION PHOTOGRAPHY AND ANCHORING MEANS THEREFOR
Filed Dec. 16, 1941　　　3 Sheets-Sheet 2
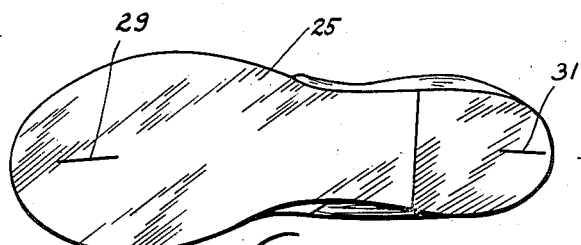
Fig. 3.
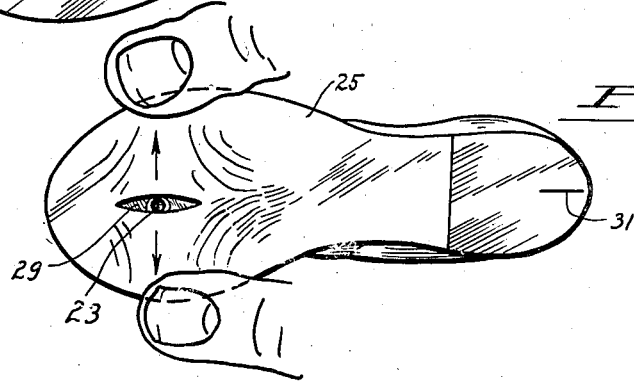
Fig. 4.
Fig. 6.　　Fig. 5.
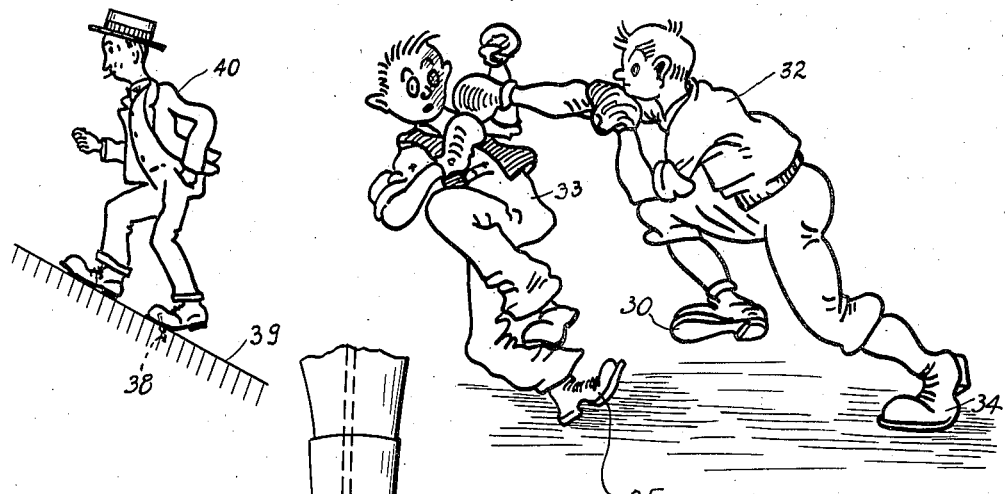
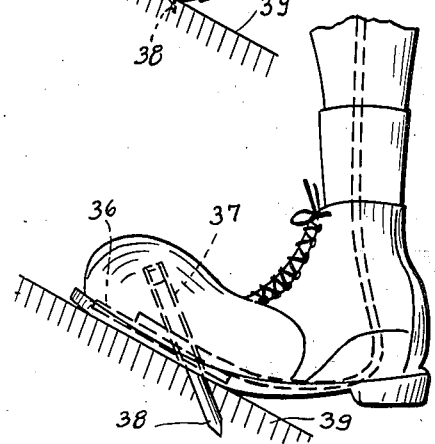
Fig. 7.
ALVIN H. COHEN
INVENTOR.
BY
ATTORNEYS Dec. 14, 1943.  A. H. COHEN  2,336,467
PUPPET FOR STOP-MOTION PHOTOGRAPHY AND ANCHORING MEANS THEREFOR
Filed Dec. 16, 1941   3 Sheets-Sheet 3
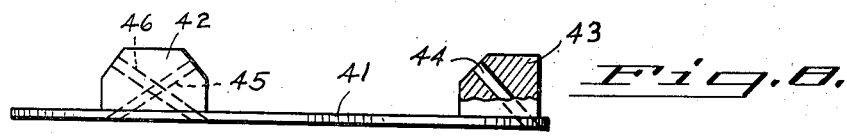
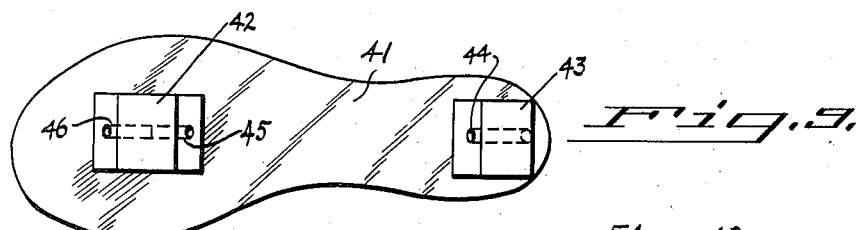
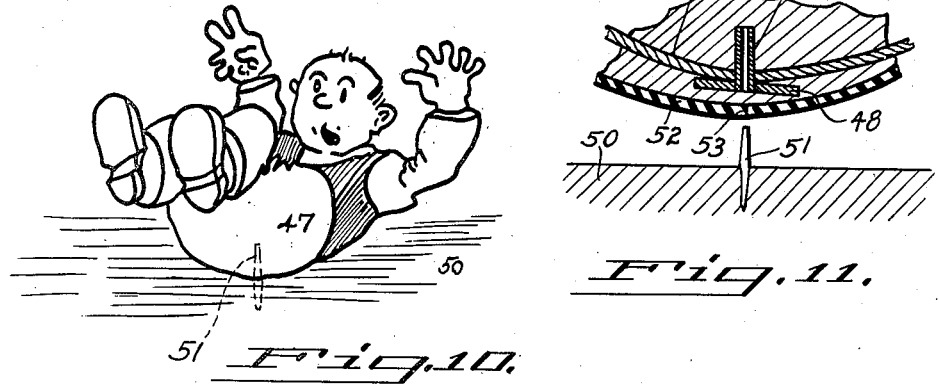
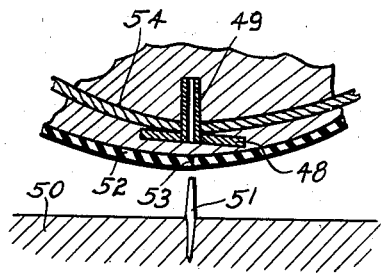
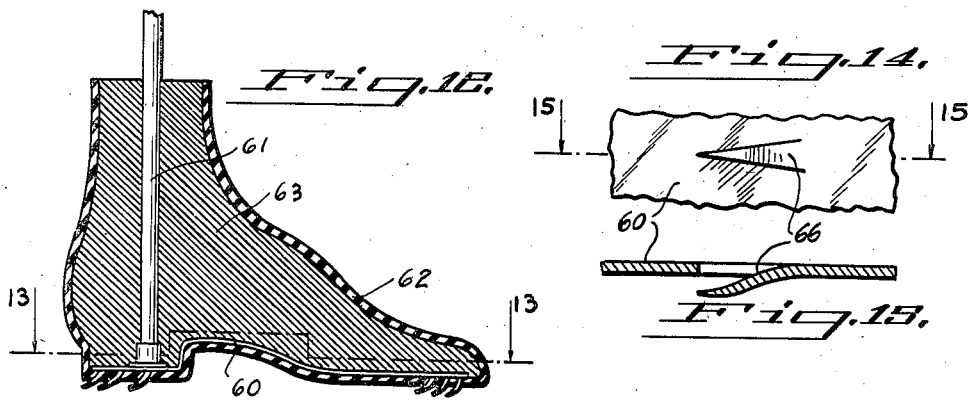
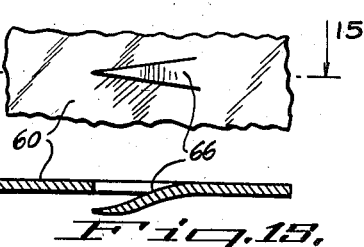
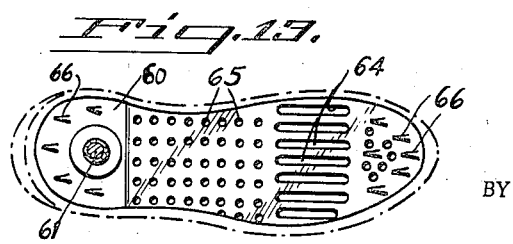
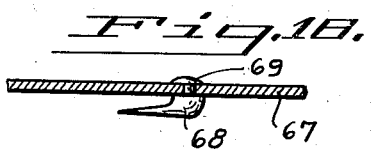
INVENTOR:
ALVIN H. COHEN
BY
ATTORNEYS Patented Dec. 14, 1943

2,336,467

UNITED STATES PATENT OFFICE 2,336,467

PUPPET FOR STOP-MOTION PHOTOGRAPHY AND ANCHORING MEANS THEREFOR

Alvin H. Cohen, New York, N. Y., assignor of one-half to Frederick L. Katz, New York, N. Y.

Application December 16, 1941, Serial No. 423,148

7 Claims. (Cl. 46—119)

My present invention relates generally to the art of stop-motion photography, and has particular reference to certain improvements in the devices forming the subject-matter of such photography.

This application constitutes a continuation-in-part of my co-pending patent application, Serial No. 300,315, filed October 20, 1939.

A general object of the invention is to provide a means for facilitating the procedure of photographing and rephotographing three-dimensional subject-matter, such as puppets or equivalent figures or devices, in a step-by-step manner, such procedure resulting in the production of so-called animated motion pictures in which the subject-matter appears to be spontaneously animatable or alive.

One of the specific objects of the present invention is to provide a simple, efficient, and practical means for temporarily anchoring or bracing a puppet, or a portion thereof, to a support with which it is to be retained in contact during the photographing and rephotographing procedure. The term "puppet" as used herein is intended to refer not only to doll-like figures simulating the complete human form, but to any of the varied devices that may be chosen as subject-matter and that require temporary bracing or anchorage, whether such device simulates all or only part of a human or animal or even a normally inanimate subject, of whatsoever known or fantastic nature. Similarly, the term "support" as used herein is intended to include within its scope of significance any floor or base, whether horizontal or inclined, or even upside-down, and, in general, any relatively fixed element or device against which a temporary anchorage may be desired or may prove to be expedient.

The removable anchoring means of the present invention may be briefly stated to consist of an attenuated member carried by one of said elements, i. e., either the puppet or the support, and adapted to penetrate into the other. For example, the puppet may be provided with a pin or prong which projects from it and is of such a character that it may be pierced into frictional engagement with a support of suitably pervious character, such as a floor or element of wood, cork, composition material, or the like. Or the attenuated member may be carried by the support in a projecting position adapted to allow penetration of the member into the puppet. It is the latter arrangement which is at present deemed by me to be the preferable one.

Where the projecting member is carried by the support, it consists essentially of a pin or its equivalent, and it preferably assumes the form of a nail-like member that may be driven into removable frictional engagement with the support. The puppet is preferably provided with a complementary socket or sleeve, arranged in a predetermined region of the puppet, preferably in concealed position within the confines of the puppet structure, for engagement with the projecting member.

Another phase of the present improvement relates more specifically to the structural nature of the puppet itself. It is a general objective to provide a distortable puppet whose external appearance resembles or simulates a desired subject, and whose contours are susceptible to manipulations and adjustments which allow minute alterations in form to be successively effected. In each adjusted or distorted position the structure must be self-sustaining, and the external surfaces and general contours must be yieldably resilient. This result is achieved by a construction which comprises a skeleton and a relatively soft yieldable resilient enclosure therefor, the skeleton being constituted of at least one relatively rigid portion and at least one deformable non-resilient portion. Preferably the structure includes an outer envelope or skin of rubber or its equivalent whose external surface can be accurately configured, embellished, colored, or ornamented to produce the desired appearance.

Such a puppet structure lends itself feasibly to the adaptation of the anchoring means hereinbefore alluded to. For example, a socket or sleeve of the character mentioned, or a prong or the like, may be secured in firm association with the relatively rigid portion of the skeleton at the time the puppet is manufactured. In the case of a socket, it may extend inwardly from a selected region of the external surface of the puppet, being concealed within the relatively soft skeleton enclosure. In the case of a projecting pin or prong, it may be similarly carried by the rigid portion of the skeleton.

Where an internal socket is provided, the skeleton enclosure is provided with an aperture which communicates with the socket, and this aperture is preferably so formed that the resilience of the outer portion of the puppet tends normally to retain the aperture in closed relatively imperceptible condition. For example, the puppet may have an outer skin of rubber or its equivalent with a slit formed at the region where access to the socket is to be obtained.

I achieve the foregoing objects and advantages, and such other objects and advantages as may hereinafter be pointed out, in the manner illustratively exemplified in the accompanying drawings in which:

Figure 1 is an exploded view showing some of the elements entering into the construction of an illustrative puppet portion simulating a foot;

Figure 2 is an enlarged cross-sectional view of the completed device;

Figures 3 and 4 are bottom views of the same, illustrating a feature of the device;

Figure 5 is a perspective view of two illustrative puppets which include foot elements of the character shown in Figures 2-4;

Figure 6 is a perspective view of another illustrative puppet which includes a foot structure of slightly modified character;

Figure 7 is an enlarged view of one of the feet of the puppet of Figure 6;

Figure 8 is an elevational view of an illustrative jig for use in connection with puppets of the present character;

Figure 9 is a plan view of Figure 8;

Figure 10 is a perspective view of another puppet employing a modified type of anchoring device;

Figure 11 is a fragmentary cross-sectional view illustrating some of the details of the anchoring means of Fig. 10;

Figure 12 is an elevational cross-sectional view of another illustrative foot construction;

Figure 13 is a cross-sectional view taken substantially along the line 13—13 of Figure 12;

Figure 14 is an enlarged detail of the base plate shown in Figures 12 and 13;

Figure 15 is a cross-sectional view taken substantially along the line 15—15 of Figure 14; and Figure 16 is a cross-sectional view similar to Figure 15 illustrating a modification.

To depict the general nature of the present invention, I have chosen to illustrate in Figures 1-4 a puppet structure simulating a foot. The skeleton portion of the device has been shown, by way of example, as comprising the two relatively rigid portions 20 and 21, and the deformable non-resilient portion 22. The elements 20 and 21 may consist of plates of metal or the like, and a suitable shape and configuration is imparted to them so that they will ultimately lie at the sole and heel portions of the foot. The element 22 may consist, as shown, of one or more lengths of flexible non-resilient wire, preferably of suitable metal or of material having equivalent properties. The element 22 may be secured to the base plates 20 and 21 in any desired manner, as by soldering or the like. The skeleton I have illustrated thus provides relatively rigid portions at the sole and heel regions, a deformable portion extending lengthwise between the sole and heel, and another deformable portion extending upwardly from the heel.

For a purpose presently to be described the base plate 20 carries a socket or sleeve 23 which extends upwardly at a rearwardly-inclined angle, the plate 20 being provided with a suitable opening so that access to the interior of the socket may be obtained from beneath the plate 20. Similarly, the rigid plate 21 has been shown with a socket or sleeve mounted thereon, this socket, however, extending in a forwardly-oblique direction. The sleeves or sockets 23—23 may be secured in association with the elements 20—21 in any suitable manner, as by soldering or otherwise.

The puppet structure is completed by mounting the skeleton within a relatively soft yieldable resilient enclosure. A preferred method of accomplishing this object is to provide an outer envelope or skin 25, composed of rubber or its equivalent, then inserting the skeleton in proper relationship within the envelope, and finally filling the envelope with a suitable filler material. Such filler material is designated by the reference numeral 26 in Figure 2, and may be composed of rubber, liquid latex, gelatine, or any other suitable natural or synthetic rubbery resin which is substantially unreactive toward the material of the skeleton and to the material of the outer envelope.

During in insertion of the filler material into the envelope or skin 25, each socket is temporarily plugged by a removable core to prevent the filler material from entering into the socket and thus permanently obstructing it. As an alternative, each socket may be permanently provided with a closed inner end of any suitable character or formation.

The skin or envelope 25 may be formed in any desired manner, preferably with the aid of suitable molds, and has its external surface accurately configured and embellished to produce the desired appearance.

A puppet thus constructed has proven to be admirably suited for the present specific purpose. It is distortable by virtue of the deformable skeleton portions and the soft nature of the skeleton enclosure, it is self-sustaining in the various positions to which it may be adjusted, and the external surfaces and general contours are yieldably resilient to prevent permanent deformation of the device.

In the course of its use in the art of stop-motion photography, a puppet structure of this character may have to be anchored, from time to time, against a suitable support. This anchoring must be of temporary and removable character and it must not interfere with the desired distortions and adjustments that are to be successively photographed. In accordance with my present invention, such a temporary anchorage or bracing is achieved in an extremely simple and efficient manner with the aid of the sockets or sleeves 23 and 24. Each of these sleeves is so formed that it constitutes a complementary element adapted to engage snugly over a pin or equivalent element projecting from the support.

Thus, in Figure 2, I have shown an illustrative support 27 in the form of an ordinary horizontal floor and I have shown a pin 28 projecting from this support. The pin preferably assumes the form of a nail-like element having a pointed end which allows it to be driven into removable frictional engagement with the support; and the support, in turn, is preferably composed of an adequately pervious material to permit the pin 28 to be associated with it. The pin 28 projects from the support 27 in a predetermined oblique direction which corresponds to the obliquity of the socket or sleeve 23. The length of the pin 28 is also chosen with due regard to the length of the socket into which it is intended to fit. Thus, when the sole portion of the foot of Figure 2 is to be anchored to the support 27, the socket 23 is engaged endwise over the pin 28.

Where the entire skeleton is enclosed, as in the illustrated embodiment, it is necessary, of course, that the bottom portion of the skeleton enclosure be provided with a suitable aperture through which the pin 28 may pass as it enters the socket 23. I have found it preferable and advantageous to provide the envelope 25 with a slit 29 (see Figures 3 and 4). Such a slit is normally retained in a closed position by the inherent resilience of the skeleton enclosure and is thus inconspicuous and scarcely perceptible. When the desired anchoring is to be effected, the slit may be spread, as indicated in Figure 4, thus forming an aperture which permits access to the lower open end of the socket 23.

The reason why it is desirable to have the slit 29 of imperceptible character is that it may become necessary or desirable to photograph the foot from underneath (as shown for example by the raised foot 30 in Figure 5), and in such a case a visible aperture would be unsightly and distracting.

My invention does not necessarily require that the skeleton include more than one relatively rigid portion. In the case of a foot, for example, it is not essential that there be both a sole plate and a heel plate. One or the other might be sufficient, depending upon requirements. However, where two such rigid portions are provided, as shown in the present drawings, the mode of operation is the same in each case. Thus, I have shown a second slit 31 in the skeleton enclosure, defining a normally closed aperture through which access may be had to the lower open end of the heel socket 24. This socket would be fitted over a complementary pin or equivalent element arranged in the support at a corresponding angle.

To illustrate the use to which the present anchorage may be put, I have shown in Figure 5 two illustrative puppet structures 32 and 33, each simulating a complete human figure. Presumably, each foot of each structure would be constructed with at least one anchoring means. In photographing these puppets in successively-adjusted relationships, the puppet foot 34 would have a sleeve or socket in the sole region (as at 23 in Figure 2), engaging a suitable pin projecting upwardly from the support on which the puppet is mounted. Similarly, the puppet foot 35, forming part of the puppet 33, would have a sleeve or socket in the heel portion (such as the socket 24 of Figure 2) engaging with a similar projecting pin carried by the floor or support. This anchorage would permit the two puppets to be adjusted successively into various distorted positions to permit the desired photographing and rephotographing to be accomplished.

In Figures 6 and 7 I have illustrated a modified construction in which the foot is provided with a skeleton having only one rigid portion 36 in the sole region of the foot. This rigid portion of the skeleton is provided with a socket 37 which is substantially like the socket 23 of Figure 2 except that it extends obliquely forwardly. This socket is adapted to engage snugly and removably with a pin 38 projecting from a support 39 at a corresponding angle. This arrangement of socket (i. e. obliquely forwardly) is desirable where the puppet is to be braced against an inclined support such as that shown at 39. In Figure 6, for example, the puppet 40, simulating a complete human figure, would be provided with feet constructed as shown in Figure 7. While one of the feet is anchored, the other could be successively adjusted into desired different positions; or, with both feet anchored to the support, other portions of the puppet might be adjusted and readjusted to bring about a desired result.

In Figures 8 and 9 I have illustrated a jig by means of which the projecting members or pins may be inserted into the support prior to the anchoring of the puppet itself to the support. The particular jig I have illustrated is intended to be used with a puppet foot of the character shown in Figure 2. It consists of a plate 41 with two blocks 42 and 43 mounted thereon. Extending through the block 43 is a bore 44 which extends in an oblique direction corresponding to the obliquity of the socket 24 of Figure 2. In the block 42 there is a bore 45 which corresponds in arrangement to the socket 23 of Figure 2.

The plate 41 is purposely made of a size and contour which corresponds to that portion of the puppet which is to be braced in contact with the support. Accordingly, once it is determined where the puppet foot is to be anchored, it is a relatively simple matter to lay the plate 41 in exactly the desired position on the support, and then to drive a pin or equivalent member into the support through either the bore 45 or the bore 44, depending upon which of the sockets of Figure 2 is to be employed in anchoring the foot. The jig is of course removed after the pin has been driven into the support.

I have illustratively shown a second bore 46 in the block 42, extending in the opposite direction, to illustrate the manner in which this same jig could be used to drive the pin 38 (Figure 7) into exactly the right position on the support 39.

The oblique arrangement of the pin that projects from the support is of particular advantage in anchoring puppet portions which are to be rigidly immovable in all directions, as in the case of the feet of Figure 5. Circumstances may arise, however, where the puppet, though braced or anchored, is to be permitted a rotative movement with respect to the support. Such a possibility is illustrated in Figure 10, in which the puppet 47 depicts a complete human figure that has fallen on its back.

In this case, the puppet is provided with a skeleton having a rigid portion 48, and the portion 48 carries a socket 49 which extends at substantially right angles to the line of contact between the puppet and the support 50. A pin or projecting member 51 is associated with the support, and the elastic enclosure 52 of the puppet may be provided with a slit 53 through which the desired engagement between the pin 51 and the socket 49 may be effected. At 54 I have illustrated a portion of the skeleton structure that would probably extend into other regions of the puppet 47.

Where the engagement between the pin and the socket is of the character that permits rotative movements of the puppet, special care must be taken that the pin and socket fit accurately and snugly. It is preferable in such a case to taper the pin slightly, as indicated in an exaggerated manner in Figure 11, and to form the socket with a corresponding taper, this relationship of parts assuring a firm frictional engagement between the pin and socket.

In Figures 12-16 I have illustrated a further modification in which the anchoring is effected by a projecting member carried by the puppet itself instead of by the support.

In Figure 12, it will be observed that the skeleton consists of a base plate 60 and an upwardly projecting wire or post 61, this skeleton being mounted within an envelope or skin 62 of suitable elastic material, the structure being completed by filling the enclosure by a suitable filler 63.

The plate 60 is of non-resilient material, preferably metal, and defines a relatively rigid sole portion that is weakened at the forward portion by the provision of a series of parallel slits 64 or by equivalent weakening means thereby allowing the resultant foot to be bent at this region in a life-like manner.

I have also shown the plate 60 provided with a series of struck-up barbs 66, which are caused to pass through the skin 62 and preferably point in a rearward direction. These barbs or projecting elements serve not only to hold the plate 60 in proper predetermined relationship to the bottom portion of the skin 62, but also afford a means for anchoring the foot to a suitable support.

Since the barbs 66 should embody as much rigidity and strength as possible, the modification of Figure 16 provides a construction wherein the base plate 67 may be of any desired rigidity or bendability, while the barbs 68 constitute separate elements that may be composed of any suitable strong material and that may be fastened in position in any desired manner, as by riveting as shown at 69.

In the plate 60 of Figures 12 and 13 I have shown a multiplicity of perforations 65. These perforations allow the foot to be anchored to a suitable support by means of small pins or nails that can be inserted directly through the body of the foot from the top. Whenever such a nail is to be used, either instead of the barbs 66 or to supplement them, it is pressed downwardly through the foot, and by feel it may be guided through one of the openings 65 into the support beneath. The nail is preferably headless or provided with only a very slight enlargement so that the rear end of the nail may pass directly through the skin 62 and thus be concealed from view.

In all of the embodiments hereinabove illustrated it is preferable that the support or flooring to which the puppet is braced be provided with a coating of fabric or the like, thereby allowing the various projecting elements to enter it and to be withdrawn from it without any holes or openings which would subsequently be visible. Where barbs are used, as in Figures 12 and 13, a very efficient anchoring means is thus provided, because the barbs wedge the material of the flooring into the space between each barb and the bottom of the foot.

In general, it will be understood that those skilled in the art may make changes in the details herein described and illustrated without departing from the spirit and scope of the invention as expressed in the appended claims. It is, therefore, intended that these details be interpreted as illustrative, and not in a limiting sense.

Having thus described my invention and illustrated its use, what I claim as new and desire to secure by Letters Patent is:

1. A puppet comprising a distortable body, a deformable skeleton therein, said skeleton comprising spaced rigid members carried by one extremity of said body, elongated hollow members carried by each of said rigid members, said hollow members extending inwardly of the body at oblique angles to the plane of the rigid members and in opposite directions and adapted to receive complementary projections carried by a support for the puppet and a resilient covering for said body having a normally closed slit in alignment with each of said hollow members.

2. As subject matter for stop-motion photography, a distortable puppet extremity comprising a skeleton, and a relatively soft yieldable resilient enclosure therefor, said skeleton comprising relatively rigid portions spaced from each other at the said extremity and connected by a deformable portion of said skeleton whereby to permit of relative motion between said rigid members, and an anchoring socket secured to one of said rigid members and embedded in said soft enclosure, said enclosure having an aperture in communication with said socket member whereby the latter may be engaged over a complementary anchoring member removably secured in a support against which the extremity is braced.

3. A puppet comprising a distortable body, a deformable skeleton therein, said skeleton comprising relatively rigid portions at spaced locations in said body and connected by deformable portions, anchoring means entirely concealed within said body comprising an elongated socket member carried by each of said rigid portions and extending into the body beyond the plane of said rigid portions, said socket members each cooperating with a complementary element removably carried by a support for the puppet.

4. A puppet foot comprising a sole portion and a heel portion, a skeleton comprising a rigid plate in each of said portions spaced from each other and connected by a deformable member, whereby to permit the sole and heel portions upon deforming the deformable member of said skeleton to assume different relative positions, anchoring means comprising a socket member carried by one of said plates and a complementary projecting member carried by a support for the puppet foot.

5. A puppet foot comprising a sole portion and a heel portion, a deformable skeleton comprising a rigid plate in each of said portions spaced from each other and connected by a deformable member, whereby to permit the sole and heel portions upon deforming the deformable member of the skeleton to assume different relative positions, anchoring means comprising a socket member carried by one of said plates and a complementary projecting member carried by the support for the puppet foot, an envelope of flexible material covering said foot and a filler of distortable material in said envelope in which said socket member is embedded, said envelope having a normally closed orifice in juxtaposition to said socket member whereby to expose said member for reception of the projecting member.

6. A puppet comprising a distortable body, a deformable skeleton therein, said skeleton comprising a plurality of spaced rigid anchoring members, a complementary anchoring element carried by a support for the puppet and adapted to engage said anchoring members to support the puppet, a relatively soft yieldable enclosure for said body, said enclosure having preformed slits therein in alignment with said anchoring members whereby the said anchoring members may be readily located for insertion of said complementary element.

7. A puppet comprising a distortable body, a deformable skeleton therein, said skeleton comprising a plurality of rigid members located in different parts of the body and connected to each other by a deformable element, a relatively soft yieldable enclosure for said body, anchoring sockets carried by each of said rigid members and concealed within said enclosure, a complementary attenuated member removably secured in a support for the puppet whereby rigidly to engage any desired anchoring socket to support the puppet in varied selected distorted positions, said enclosure having preformed slits in alignment with each of said sockets for designating the location of the sockets and for reception of said attenuated member, said slits being so formed that the resilience of the enclosure tends normally to retain said slits in closed relatively imperceptible condition.

ALVIN H. COHEN.